United States Patent [19]

Cloutier et al.

[11] 4,438,191

[45] Mar. 20, 1984

[54] MONOLITHIC INK JET PRINT HEAD

[75] Inventors: Frank L. Cloutier; Robert N. Low, both of Corvallis; Paul H. McClelland, Monmouth, all of Oreg.

[73] Assignee: Hewlett-Packard Company, Palo Alto, Calif.

[21] Appl. No.: 443,971

[22] Filed: Nov. 23, 1982

[51] Int. Cl.[3] .................... G01D 15/18

[52] U.S. Cl. .................... 430/324; 346/140 R; 204/15

[58] Field of Search .................... 346/140 R, 1.1, 140 PD; 430/324; 427/58; 204/15

[56] References Cited

U.S. PATENT DOCUMENTS

| | | | |
|---|---|---|---|
| 4,251,824 | 2/1981 | Shirato | 346/140 PD |
| 4,336,548 | 6/1982 | Matsumoto | 346/140 PD |
| 4,394,670 | 7/1983 | Sugitani | 346/140 PD |

*Primary Examiner*—Michael R. Lusignan
*Assistant Examiner*—James J. Seidleck
*Attorney, Agent, or Firm*—Joseph H. Smith

[57] ABSTRACT

A method of making a monolithic bubble-driven ink jet print head is provided which eliminates the need for using glue or other adhesives to construct multiple part assemblies. The concept of the method is to provide a layered structure which can be manufactured by relatively standard integrated circuit and printed circuit processing techniques. First, a substrate/resistor combination is manufactured. Then a foundation of conductive material is firmly attached to the substrate and a resist layer is used to define a perimeter/wall combination over the foundation, with the perimeter/wall combination surrounding the resistors and providing hydraulic separation between them. The perimeter/wall combination is then electroplated in place. A flash coat of metal is applied over the resist which is inside the perimeter of the perimeter/wall combination and a second layer of resist is used to define the desired orifices and the external shape of the part. A second layer of metal is then electroplated in place on the flash coat covering the first layer of resist and the perimeter/wall combination. The flash coat and resists are then stripped, leaving a void defined by the second layer of metal and the perimeter/wall combination, with this second layer of metal having an orifice therein. The void forms the firing chamber for supplying ink to the resistors during operation.

12 Claims, 12 Drawing Figures

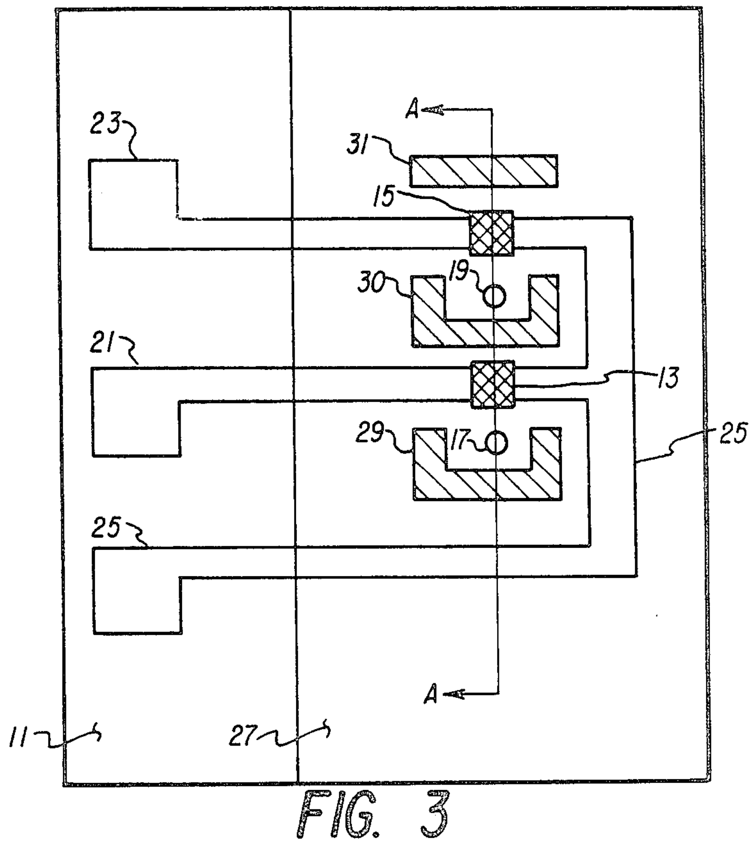
FIG. 3
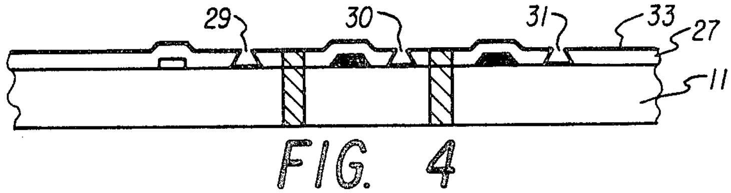
FIG. 4
FIG. 5
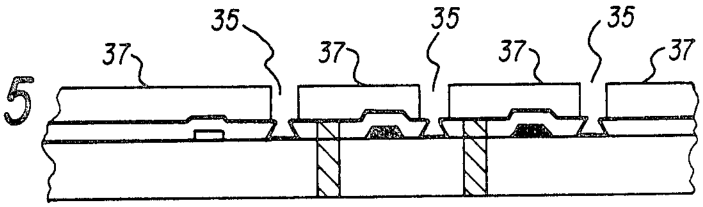

MONOLITHIC INK JET PRINT HEAD

BACKGROUND OF THE INVENTION

This invention relates to a new method construction of a bubble-driven ink jet print head which results in a monolithic structure.

The background with regard to bubble driven ink jet printing is adequately represented by co-pending U.S. application Ser. No. 292,841 by Vaught, et al., assigned to Hewlett-Packard Company, and by the following U.S. patents assigned to Canon Kabushiki Kaisha, Tokyo, Japan: U.S. Pat. Nos. 4,243,994; 4,296,421; 4,251,824; 4,313,124; 4,325,735; 4,330,787; 4,334,234; 4,335,389; 4,336,548; 4,338,611; 4,339,762; and 4,345,262. The basic concept there disclosed is a device having an ink-containing capillary, an orifice plate with an orifice for ejecting ink, and an ink heating mechanism, generally a resistor, in close proximity to the orifice. In operation, the ink heating mechanism is quickly heated, transferring a significant amount of energy to the ink, thereby vaporizing a small portion of the ink and producing a bubble in the capillary. This in turn creates a pressure wave which propels an ink droplet or droplets from the orifice onto a closeby writing surface. By controlling the energy transfer to the ink, the bubble quickly collapses before any ink vapor can escape from the orifice.

In each of the above-references, however, the print heads described consist of multiple part structures. For example, resistors are most often located on a substrate, and an orifice plate having accurately scribed ink capillaries must be attached to the substrate with great care to insure proper alignment of the resistors and ink capillaries. Generally, this attachment is performed by gluing, solder glass attachment, or anodic bonding. Such meticulous handling of multiple part assemblies adds greatly to the cost of production of such print heads.

SUMMARY OF THE INVENTION

In accordance with a preferred embodiment of the invention, a method of making a monolithic bubble-driven ink jet print head is provided which eliminates the need for using glue or other adhesives to construct multiple part assemblies. The concept of the method is to provide a layered structure which can be manufactured by relatively standard integrated circuit and print circuit processing techniques. First, a substrate/resistor combination is manufactured. Then a foundation of conductive material is firmly attached to the substrate and a resist layer is used to define a perimeter/wall combination over the foundation, with the perimeter/wall combination surrounding the resistors and providing hydraulic separation between them. The perimeter/wall combination is then electroplated in place. A flash coat of metal is applied over the resist which is inside the perimeter of the perimeter/wall combination and a second layer of resist is used to define the desired orifices and the external shape of the part. A second layer of metal is then electroplated in place on the flash coat covering the first layer of resist and the perimeter/wall combination. The flash coat and resists are then stripped, leaving a void defined by the second layer of metal and the perimeter/wall combination, with this second layer of metal having an orifice therein. The void forms the firing chamber for supplying ink to the resistors during operation.

BRIEF DESCRIPTION OF THE DRAWINGS

FIG. 3 illustrates the locations of the foundation used in constructing the monolithic ink jet print head.

FIGS. 1 through 5 show the results of several steps of the method.

DETAILED DESCRIPTION OF THE INVENTION

Figure 1:
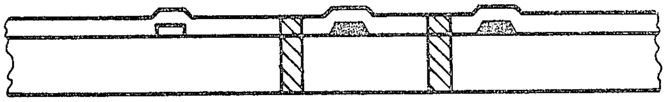
FIG. 1 illustrates a cross-section of a typical resistor substrate combination.
Figure 2:
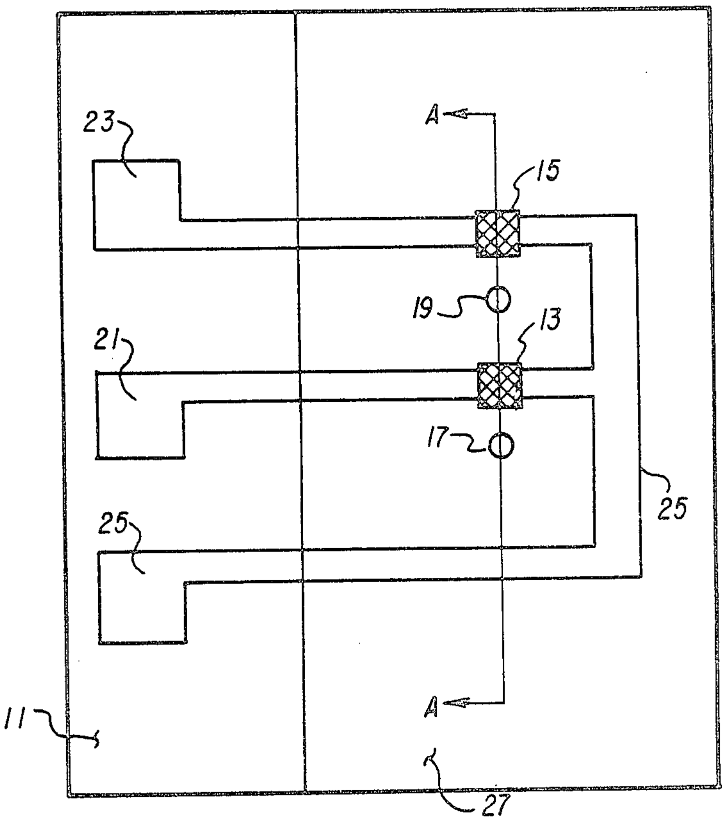
FIG. 2 shows a top view of the device of FIG. 1, the cut A—A corresponding to the cross-section of FIG. 1.

In accordance with a preferred embodiment of the invention, a method is provided for making a monolithic bubble-driven ink jet (bubble-jet) print head. In order to illustrate the method, it is best to begin with a relatively standard bubble-jet substrate/resistor combination. As illustrated in FIGS. 1 and 2, a substrate 11 is provided on which two thin film resistors 13 and 15 are deposited. Also shown are two ink-feed capillaries 17 and 19 through substrate 11 for supplying ink to the resistors. Electrical conductors 21 and 23 provide electrical power to resistors 13 and 15, respectively, and conductor 25 provides a common ground. Over the top of these resistors and conductors is a passivation layer 27. Although nearly any of materials and processes well known in the bubble-jet art can be used in the above fabrication, in the preferred embodiment, the chosen substrate is glass, typically 30 to 40 mils thick; resistors 13 and 15 are tantalum-aluminum approximately 3 mils×3 mils, up to about 5 mils×6.5 mils to provide a resistance of about 60 ohms; conductors 21, 23 and 25 use a sandwich of aluminum, nickel, and gold, and passivation layer 27 a two-layer composite of $Al_{2}0_{3}$ and $SiO_2$ approximately 1.5 microns thick.

Following construction of the substrate/resistor combination illustrated in FIGS. 1 and 2, the passivation layer is masked and etched with HF to provide footers (i.e., indentations) 29, 30, and 31, as illustrated in FIGS. 3 and 4. (Although passivation layer 27 could have been masked to provide these indentations when it was first deposited, it has been found to be more convenient when using the above materials for the passivation to mask and etch after deposition.) Following construction of the footers, the entire passivation layer, including the footers, is coated with a thin layer of metal, or flash coat, to form a conductive foundation 33. Typically, the flash coat is formed by electroless plating of Ni to a thickness of about 2000 Angstroms. Other techniques such as vacuum deposition can be used for the flash coat as well, as can different materials such as Cu and Au. However, electroless Ni plating is preferred.

Figure 6:
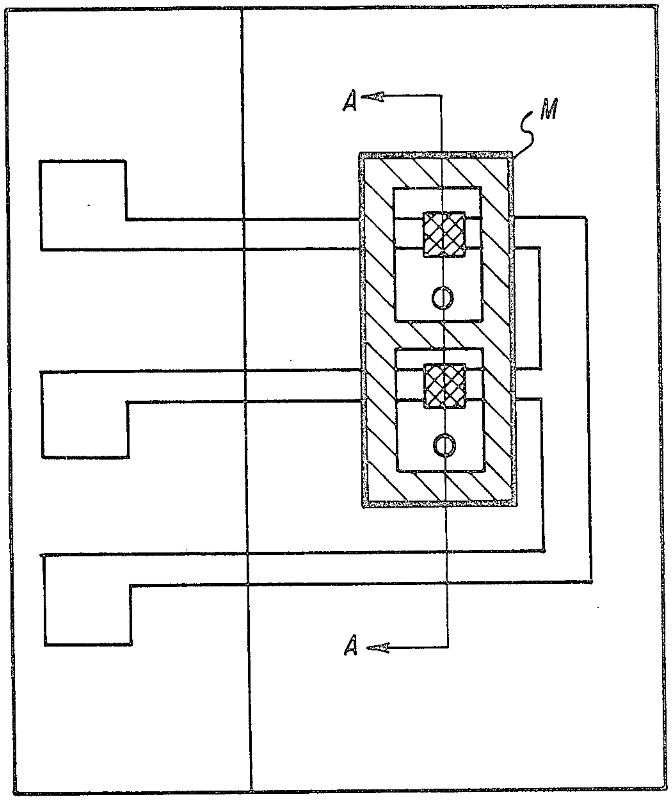
FIG. 6 shows a mask used for defining the perimeter/wall combination.

After the flash coat, the surface is covered with a suitable resist to a thickness of about 2 mils, e.g., a dry film photoresist such as Riston (a registered trademark of Dupont) having a thickness of 1.8 mils is quite adequate. The resist is then masked, exposed, and developed. FIG. 5 provides a cross-sectional view of the completed structure showing the remaining resist 37 and a hole 35 defining a perimeter/wall combination. In FIG. 6 is shown a mask M illustrating an appropriate shape and location for defining the perimeter/wall combination which completely surrounds both the resistors and the ink feed capillaries, and provides a separation between the two resistors in order to avoid cross-talk during operation.

Figure 7:
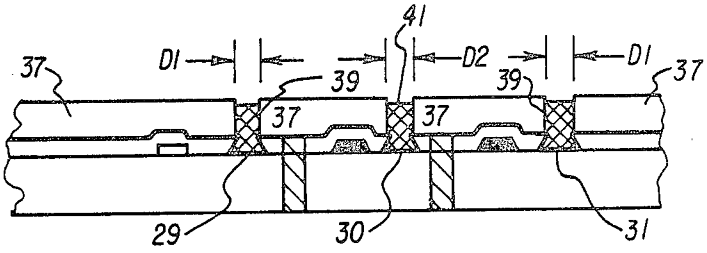
FIGS. 7 through 11 illustrate the remaining steps of the method.

Following an activating etch, hole 35 is electroplated with a metal such as Ni, Cu, and Au to provide good adhesion to foundation 33, the depth of the plating typically being just below the level of resist 37 (approximately 1.5 mils above the surface of the passivation layer for a 1.8 mil Riston layer, to provide the perimeter/wall combination made up of perimeter 39 and wall 41 as illustrated in FIG. 7). As shown, footers 29, 30, and 31 are now filled with metal and firmly anchor the perimeter/wall combination to the substrate. Generally, the thickness of perimeter 39 and wall 41 can vary widely depending on the desired distance between resistors. Typically for an ink jet head having a center-to-center separation between resistors of 50 mils, the preferred thickness D1 of perimeter 39 is about 50 mils, and the preferred thickness D2 of wall 41 is about 5 to 10 mils.

It should be apparent to those skilled in the art, however, that with a sufficient thickness for perimeter 39, the footers 29, 30, and 31 are not required, and that perimeter 39 and wall 41 can also be adequately secured directly to the flat surface of the flash coated passivation layer 27. The reason is that the higher the adhesive force between the electroplated perimeter and the flash coated surface, the flash coat itself again acting as a foundation. For adhesive strengths of interest in the bubble-jet head, some thickness of the perimeter can be found which will meet the desired adhesive force requirement without having to use footers. In practice, however, it has been found to be advantageous to provide the footers as illustrated in the preferred embodiment in order to have both high strength and small size. Similarly, it is conceivable that a bubble-jet print head might be built without a passivation layer at all. In that case, the flash-coat foundation could be attached directly to the substrate by either of the above methods, i.e., with or without footers. The principle is the same. The purpose of the foundation is to attach the perimeter/wall combination soundly to the substrate, whether it be directly or indirectly by means of an intervening layer such as passivation layer 27, and that the attachment be done by standard techniques to provide a monolithic structure, instead of gluing together multiple part assemblies.

Figure 8:
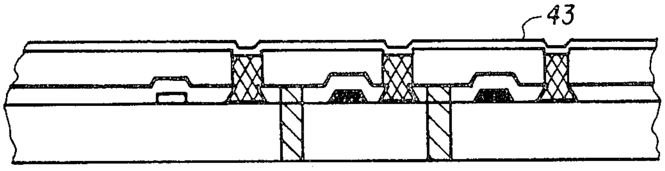
Figure 9:
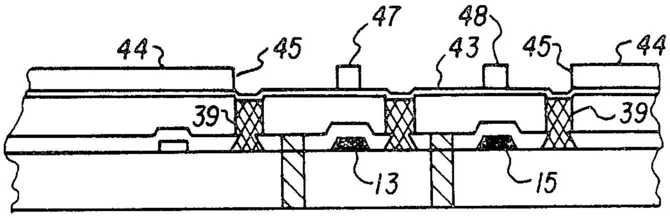

As illustrated in FIG. 8, following construction of the perimeter/wall combination, the surface of the device is given a second flash coat 43, typically Ni (although Cu or Au could be used as well), to provide a conductive surface over resist 37. A second layer of resist is laid up over the conductive surface, and is masked and etched to provide the cross-section shown in FIG. 9. This provides a resist layer 44 having a boundary 45 which coincides vertically with the outer surface of perimeter 39 as shown, and which completely surrounds the resistors. Also provided are two resist cylinders 47 and 48 located over resistors 13 and 15, respectively, which are used to define the shape of the orifices for the device. Typical thicknesses for resist layer 44 and resist cylinders 47 and 48 range from about 1 to 3 mils, the preferable thickness being about 2 mils. Typical diameters for resist cylinders 47 and 48 range from about 2.8 to about 4.4 mils.

Figure 10:
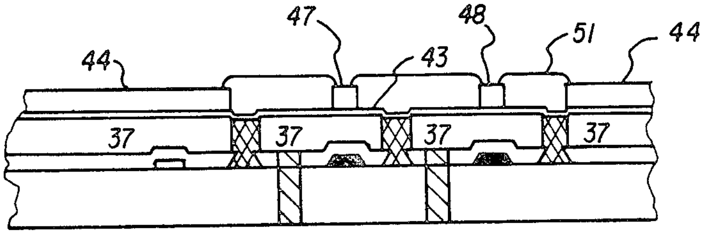
Figure 11:
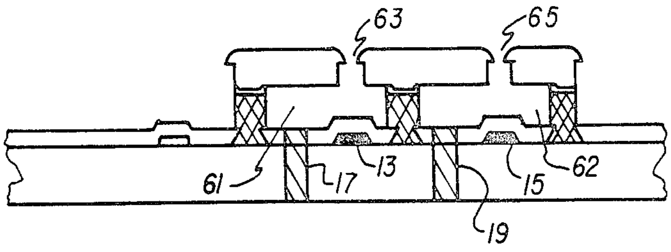
Figure 12:
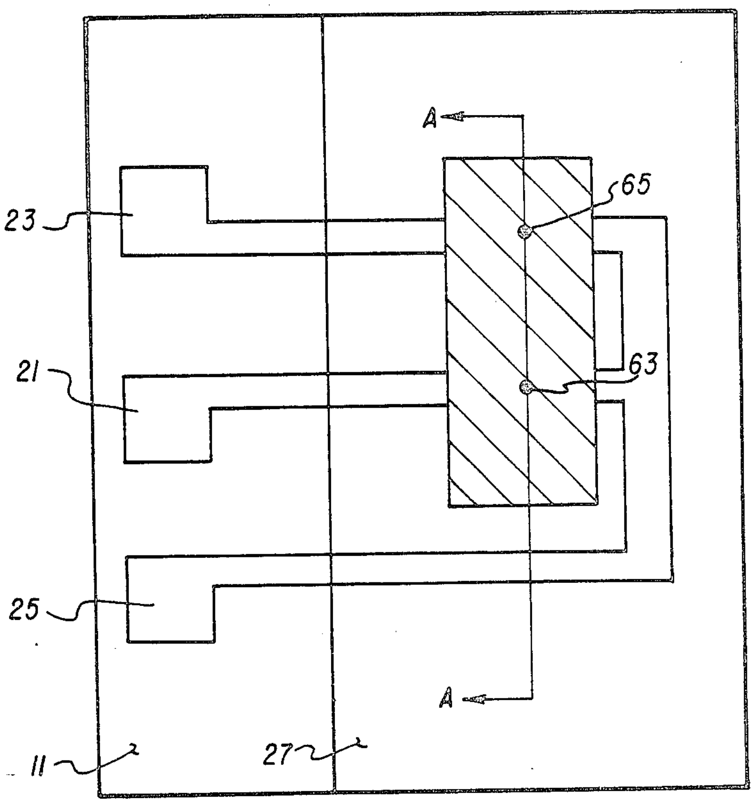
FIG. 12 shows a top view of the completed device.

After another activating etch, the next step is to electroplate the unmasked portions of flash coat 43 to a depth slightly thicker than the resist layer to provide an orifice plate 51 as shown in FIG. 10. By controlling the depth of this overplating the diameters of the unplated portions of resist cylinders 47 and 48 can be controlled, thereby selecting the desired orifice size for the device. In the preferred embodiment, orifice plate 51 is typically Ni, approximately 2.2 mils thick, although other metals or alloys and other thicknesses could be used without deviating from the concept of the invention. Following electroplating of orifice plate 51, resists 37, 44, 47, and 48 are stripped with a hot etching solution, e.g., 10–20% AP-627 of Inland Specialty Chemical at 130 degrees F., and flash coat 43 is etched away leaving the completed monolithic bubble-jet print head as illustrated in FIGS. 11 and 12. The voids left by stripping the resist and flash coat form firing chambers 61 and 62 which correspond to resistors 13 and 15, respectively. These chambers are fed by ink-feed capillaries 17 and 19, and orifices 63 and 65 provide for the ejection of ink droplets from the device. Orifices 63 and 65 range in diameter from 2.2 to about 4 mils.

A primary advantage of the above method over conventional bubble-jet construction techniques, is that each layer of the structure can be aligned to the same targets so that standard mask aligning devices can be used. Furthermore, there are no glue lines or multiple part assemblies as in prior art devices, thus promoting very low cost, high volume manufacturing.

It should be understood by those skilled in the art, that the concept of the invention also applies to bubble-jet print heads which are not resistor driven, e.g., such as those driven with lasers or electron beams (see copending application Ser. No. 443,710, ELECTRON BEAM DRIVEN INK JET PRINTER HEAD, filed Nov. 22, 1982, by Hanlon, et al. Also, it should be apparent that the concept of the invention is not restricted to a print head having only two orifices but applies as well to a device having only one orifice or to a device having a large array of orifices. Furthermore, the concept can be applied to provide a device which has an orifice oriented in many different directions other than perpendicular to the top surface of the orifice plate, simply by changing the vertical orientation of the resist cylinders 47 and 48.

What is claimed is:

1. In a method for constructing a monolithic bubble-driven ink jet print head having a substrate and a heat source attached to said substrate for producing bubbles, the steps comprising:

forming an electrically conductive foundation surrounding said heat source, said foundation attached to said substrate;

applying a first resist over said substrate and said heat source;

exposing said first resist to define a wall over said foundation, said wall forming a perimeter surrounding said heat source;

removing those portions of said first resist where said wall is to be located;

depositing a first metal layer onto said foundation to form said wall;

forming a conductive surface over the remaining portions of said first resist which are contained within said perimeter;

applying a second resist over said conductive surface;

exposing said second resist to define an orifice;

depositing a second metal layer over said wall and said conductive surface; and stripping away said first and second resist and those portions of said conductive surface formed over said first resist, to provide a monolithic print head with a void therein defined by said wall and said metal layer, and to provide an orifice in said second metal layer, said void communicating with said orifice.

2. A method as in claim 1 wherein the step of forming said electrically conductive foundation is performed by electroless plating.

3. A method as in claim 1 wherein said print head comprises a passivation layer over said substrate.

4. A method as in claim 3 wherein the step of forming an electrically conductive foundation comprises the step of forming an indentation in said passivation layer where said foundation is desired.

5. A method as in claim 4 comprising the step of coating said indentation with a first conductive material.

6. A method as in claim 5 wherein said step of coating said indentation with a first conductive material is performed by electroless plating.

7. A method as in claim 6 wherein said first conductive material is Ni.

8. A method as in claim 1 wherein said void is created without use of adhesives to bond together multiple parts.

9. A method as in claim 1 wherein the step of depositing a first metal layer is performed by electroplating.

10. A method as in claim 9 wherein said first metal layer is Ni.

11. A method as in claim 1 wherein the step of depositing a second metal layer is performed by electroplating.

12. A method as in claim 10 wherein said second metal layer is Ni.

* * * * *